United States Patent
Jaruvatee et al.

(10) Patent No.: US 10,914,215 B2
(45) Date of Patent: Feb. 9, 2021

(54) MIXER DEVICE FOR AN EXHAUST GAS AFTERTREATMENT SYSTEM OF A MOTOR VEHICLE, EXHAUST GAS AFTERTREATMENT SYSTEM, AND MOTOR VEHICLE

(71) Applicant: Robert Bosch GmbH, Stuttgart (DE)

(72) Inventors: Chaiwat Jaruvatee, Stuttgart (DE); Siegurd Kloeckner, Cologne (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 16/311,111

(22) PCT Filed: Jun. 20, 2017

(86) PCT No.: PCT/EP2017/065046
§ 371 (c)(1),
(2) Date: Dec. 18, 2018

(87) PCT Pub. No.: WO2018/001789
PCT Pub. Date: Jan. 4, 2018

(65) Prior Publication Data
US 2020/0309008 A1 Oct. 1, 2020

(30) Foreign Application Priority Data
Jun. 29, 2016 (DE) .......... 10 2016 211 703

(51) Int. Cl.
*F01N 3/20* (2006.01)
*F01N 3/28* (2006.01)
*B01F 3/04* (2006.01)

(52) U.S. Cl.
CPC ......... *F01N 3/2066* (2013.01); *F01N 3/2892* (2013.01); *B01F 3/04049* (2013.01); *F01N 2240/20* (2013.01); *F01N 2610/1453* (2013.01)

(58) Field of Classification Search
CPC combination set(s) only.
See application file for complete search history.

(56) References Cited

U.S. PATENT DOCUMENTS 9,995,193 B2 * 6/2018 Alano .................. B01F 5/0614
10,252,225 B2 * 4/2019 Tyni ..................... B01F 5/0065
(Continued)

FOREIGN PATENT DOCUMENTS

| CN | 105464765 A | 4/2016 |
| DE | 102011051875 A1 | 6/2012 |

(Continued)

OTHER PUBLICATIONS

International Search Report dated Sep. 1, 2017 of the corresponding International Application PCT/EP2017/064046 filed Jun. 20, 2017.

*Primary Examiner* — Binh Q Tran
(74) *Attorney, Agent, or Firm* — Norton Rose Fulbright US LLP; Gerard Messina

(57) ABSTRACT

A mixer device for an exhaust gas aftertreatment system of a motor vehicle includes a cylindrical housing that has a lateral wall in which there is an injection opening for an exhaust gas aftertreatment medium, a first end wall in which at least one inlet opening is formed, and a second end wall in which an outlet opening is formed; at least one air guiding element situated in the housing, that extends in curved a manner, and that guides an exhaust gas flow from the at least one inlet opening to the outlet opening; and at least one impact surface for the exhaust gas flow and/or the exhaust gas aftertreatment medium situated in the housing downstream from the inlet opening and oriented essentially perpendicularly to the injection direction of the exhaust gas aftertreatment medium.

15 Claims, 1 Drawing Sheet

(56) References Cited

U.S. PATENT DOCUMENTS

| | | | |
|---|---|---|---|
| 10,287,948 B1* | 5/2019 | Moulieres | B01F 3/04049 |
| 10,704,448 B2* | 7/2020 | Wang | B01F 5/0473 |
| 2009/0071133 A1 | 3/2009 | Mabuchi | |
| 2012/0144812 A1* | 6/2012 | Hyun | B01F 5/0268 |
| | | | 60/301 |
| 2015/0240692 A1 | 8/2015 | De Rudder | |
| 2016/0319724 A1* | 11/2016 | Alano | F01N 3/208 |

FOREIGN PATENT DOCUMENTS

| | | |
|---|---|---|
| DE | 102013005206 B3 | 6/2014 |
| DE | 102014117687 A1 | 6/2015 |
| DE | 112012006957 T5 | 6/2015 |
| DE | 202015003874 U1 | 8/2015 |
| DE | 112014003949 T5 | 5/2016 |
| JP | 2015110929 A | 6/2015 |

\* cited by examiner

MIXER DEVICE FOR AN EXHAUST GAS AFTERTREATMENT SYSTEM OF A MOTOR VEHICLE, EXHAUST GAS AFTERTREATMENT SYSTEM, AND MOTOR VEHICLE

CROSS-REFERENCE TO RELATED APPLICATIONS

The present application is the national stage of International Pat. App. No. PCT/EP2017/065046 filed Jun. 20, 2017, and claims priority under 35 U.S.C. § 119 to DE 10 2016 211 703.3, filed in the Federal Republic of Germany on Jun. 29, 2016, the content of each of which are incorporated herein by reference in their entireties.

FIELD OF THE INVENTION

The present invention relates to a mixer device for an exhaust gas aftertreatment system of a motor vehicle, which includes a cylindrical housing including a lateral wall, a first end wall, and a second end wall, an injection opening for an exhaust gas aftertreatment medium being formed in the lateral wall, and at least one air guiding element being situated in the housing, which extends in a curved manner and guides an exhaust gas flow from at least one inlet opening to an outlet opening formed in the second end wall. The present invention also relates to an exhaust gas aftertreatment system including such a mixer device and to a motor vehicle including an appropriate exhaust gas aftertreatment system.

BACKGROUND

Different methods and devices are known for the aftertreatment of exhaust gases, in particular, of diesel engines, which are utilized for reducing the harmful constituents of the exhaust gas. A frequently utilized method is the so-called selective catalytic reduction (SCR) for reducing the NOx constituents in the exhaust gas. In this case, an aqueous urea solution, as the exhaust gas aftertreatment medium, is injected into the exhaust gas flow, mixes with the exhaust gas and, downstream therefrom, reacts with the exhaust gas in a catalytic converter in order to reduce the NOx. The result of the exhaust gas aftertreatment is optimizable by way of an improved mixing of the exhaust gas aftertreatment medium and the exhaust gas. It is known, for example, to provide a mixer device for the mixing, which is of the type already described, for example, in the unexamined patent application DE 10 2013 005 206 B3. This mixer device includes, in the housing, a helically extending air guiding element, whereby a swirl is imparted to the exhaust gas flow and, in the case of very little installation space, a preferably long mixing section is made available. The air guiding element guides the exhaust gas flow from the inlet opening to an outlet opening in the second end wall, where the exhaust gas flow-exhaust gas aftertreatment medium mixture emerges from the mixer device and is routed to the SCR catalytic converter. Due to the increasingly stricter exhaust gas regulations, great efforts are being made to reduce the emissions, in particular, the portion of NOx, in the exhaust gas. As a result, inter alia, the temperature of the exhaust gas flow decreases. This has the disadvantage for the SCR catalytic converter that it is more difficult to reach the necessary reaction temperature for the reduction of the NOx constituents. Normally, the SCR catalytic converter is situated far away from the internal combustion engine, whereby further temperature losses occur. The closer the catalytic converter is situated to the internal combustion engine, and the shorter the path which the exhaust gas flow must travel from the internal combustion engine to the catalytic converter, the better is the result of the aftertreatment.

SUMMARY

A mixer device according to an example embodiment of the present invention has an advantage that an even further improved mixing of exhaust gas and exhaust gas aftertreatment medium takes place in a small space, the mixer device being situatable close to the internal combustion engine and nevertheless ensuring a sufficient mixing path for sufficient mixing. This is achieved in that the inlet opening is formed in the first end wall, and at least one impact surface for the exhaust gas flow and/or the exhaust gas aftertreatment medium is situated in the housing downstream from the inlet opening, the impact surface being oriented at least essentially perpendicularly to the injection direction of the exhaust gas aftertreatment medium. As a result of the embodiment of the mixer device, the exhaust gas aftertreatment medium in the housing impacts the impact surface at least essentially perpendicularly, whereby an atomization of the, in particular, liquid exhaust gas aftertreatment medium takes place. As a result, larger drops of the exhaust gas aftertreatment medium are divided into smaller drops which can more easily blend with the exhaust gas flow. In addition, an advantageous heat transfer also takes place between the exhaust gas flow and the impact surface.

According to an example embodiment of the present invention, it is provided that at least one further air guiding element is situated in the housing, downstream from the inlet opening, in parallel to the air guiding element extending in a curved, in particular, helical manner, and includes at least one laterally projecting impact element forming the impact surface. The further air guiding element preferably does not extend across the entire length of the air guiding element, but rather only across a section thereof, so that the further air guiding element is shorter than the air guiding element. The at least one impact element, which provides the impact surface for the exhaust gas aftertreatment medium and the exhaust gas flow, is formed on the air guiding element. Due to the advantageous embodiment of the further air guiding element, the gas guidance in the housing is further improved and a heat transfer from the exhaust gas flow to the housing and vice versa is advantageously made possible.

Moreover, it is preferably provided that the further air guiding element includes multiple impact elements, each of which forms an impact surface. Therefore, the further air guiding element is provided with multiple impact surfaces and the atomization of the exhaust gas aftertreatment medium is correspondingly improved. In particular, the impact elements are spaced apart from one another on the further air guiding element in order, in particular, to also make areas available, in which the exhaust gas flow can flow, without barriers, in parallel to the extension of the air guiding element, so that the flow speed of the exhaust gas flow is not excessively reduced and undesirable turbulences in the exhaust gas flow are avoided.

According to an example embodiment of the present invention, it is provided that the particular impact element is designed as an impact tab bent out of the further air guiding element. The impact element or the impact elements is/are designed, in this regard, in particular, as one piece with the further air guiding element and, therefore, are implementable in a cost-effective and installation-friendly manner.

Moreover, it is preferably provided that multiple inlet openings are formed in the first end wall. As a result, the exhaust gas flow enters the housing through multiple inlet openings. Due to the fact that the inlet openings are formed in the first end wall, the exhaust gas flow enters the housing axially, at least in some areas. Preferably, an inflow channel is assigned to the inlet openings, which is oriented in such a way that the exhaust gas flow is introduced into the housing obliquely rather than axially, so that the exhaust gas flow is guided in the direction of the further air guiding element and supports the generation of the swirl in the housing.

Moreover, it is preferably provided that the first end wall includes a section that extends in parallel to the injection direction of the exhaust gas aftertreatment medium and is designed without openings or is closed. As a result, it is ensured that the exhaust gas flow does not penetrate the housing directly, at least in this section, and, as a result, the exhaust gas aftertreatment medium injected into the housing is deflected in such a way that the exhaust gas aftertreatment medium no longer impacts the further air guiding element. The section is selected, in this regard, in such a way that the flow of the injected exhaust gas aftertreatment medium is not deflected away from the further air guiding element via the exhaust gas. Rather, it is provided that the inlet openings are situated adjacent to the section, and so an advantageous blending with the exhaust gas aftertreatment medium results, in particular, in the area of the further air guiding element.

According to an example embodiment of the present invention, it is provided that the section begins at the level of the injection opening and ends spaced apart from the at least one further air guiding element. In particular, one of the inlet openings is located upstream from the air guiding element, so that, in this area, a mixing with the injected exhaust gas aftertreatment medium takes place already upstream from or directly at the further air guiding element.

Moreover, it is preferably provided that the outlet opening is eccentrically situated in the second end wall. As a result, a pressure drop of the mixer device is reduced, due to the fact that the cross section of the flow channel through the housing is enlarged. The outlet opening is preferably designed in the shape of a circle or an oval. Alternatively, the outlet opening can also have another cross-sectional shape. In particular, a cross-sectional shape is selected, which further reduces the pressure drop in the mixer device and optimizes a uniform application of the exhaust gas flow-exhaust gas aftertreatment medium mixture onto the downstream SCR catalytic converter.

According to an example embodiment, an exhaust gas aftertreatment system includes the described mixer device, and the aforementioned advantages therefore result also in this case.

According to an example embodiment, a motor vehicle includes the exhaust gas aftertreatment system.

Further advantages and preferred features and combinations of features result, in particular, from the description, above, as well as from the claims.

The present invention is to be explained in greater detail in the following with reference to the drawings.

DETAILED DESCRIPTION

Figure 1:
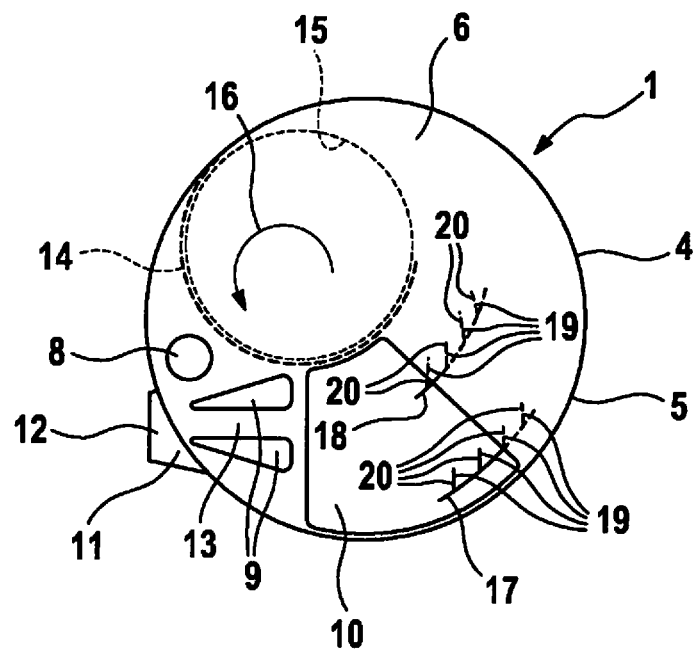
FIG. 1 shows a top view of a mixer device for an exhaust gas aftertreatment system of a motor vehicle, according to an example embodiment of the present invention.

FIG. 1 shows, in a simplified top view, a mixer device 1 for an exhaust gas aftertreatment system of a motor vehicle, which is not represented here in greater detail. Mixer device 1 is situatable, in particular, fluidically, between an oxidation catalytic converter and an SCR catalytic converter or an SCR-coated particulate filter downstream from an internal combustion engine and is utilized for optimally mixing an exhaust gas aftertreatment medium with the exhaust gas flow of the internal combustion engine, so that an advantageous reduction of nitrogen oxides can take place in the downstream SCR catalytic converter.

Figure 2:
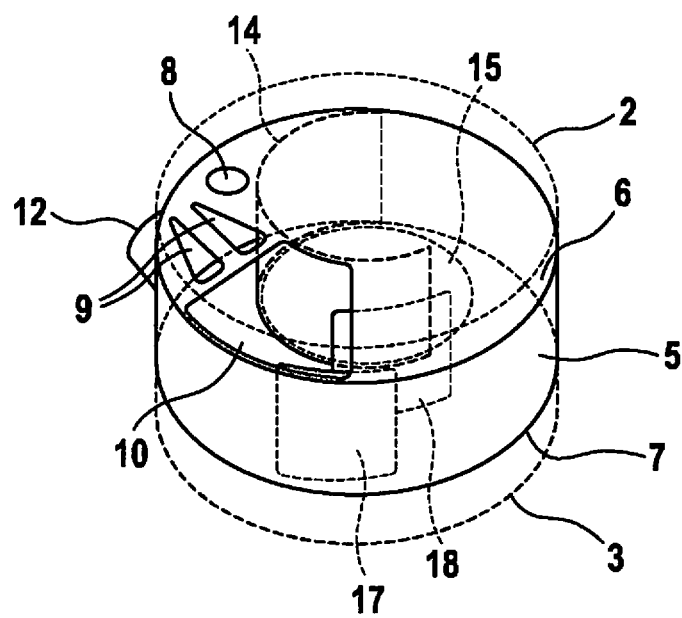
FIG. 2 shows a perspective representation of the mixer device, according to an example embodiment of the present invention.

FIG. 2 shows a perspective representation of mixer device 1, upstream oxidation catalytic converter 2 and downstream SCR catalytic converter 3 or the SCR-coated particulate filter being indicated using dashed lines.

Mixer device 1 includes a housing 4 which includes a lateral wall 5 extending circularly in this case, a first end wall 6, and a second end wall 7. End walls 6 and 7 are aligned in parallel to each other and are spaced apart from each other in accordance with the height of lateral wall 5. Housing 4 is designed in the shape of a cylinder in this regard.

First end wall 6 includes multiple inlet openings 8, 9, and 10. Inlet opening 8 is optionally designed in the shape of a circle in this case, inlet openings 9 are designed in the shape of a wedge, and inlet opening 10 is designed in the shape of a circle segment. The placement and design of inlet openings 8, 9, and 10 will be discussed in greater detail further below.

Lateral wall 5 includes an injection opening 11 for liquid exhaust gas aftertreatment medium, injection opening 11 being formed on the end of an injection nozzle 12. Injection nozzle 12 is utilized, for example, for accommodating an injection valve, so that a metered injection of the exhaust gas aftertreatment medium takes place, with the aid of the injection valve, directly at mixer device 1. Nozzle 12 is oriented, in this case, in such a way that the liquid exhaust gas aftertreatment medium is injected into housing 4 in the direction of a secant.

First inlet opening 8 is situated approximately upstream from inlet opening 11 in this case, and inlet openings 9 begin approximately at the level of injection opening 11 and extend essentially in parallel to the injection direction, their inner width expanding in this case, whereby the aforementioned wedge shape results. The two inlet openings 9 are positioned inversely with respect to each other in this case, so that a section 13, which is designed without openings, lies between them. This section 13 extends from injection opening 11 up to inlet opening 10 in end wall 6. By way of section 13, it is ensured that the exhaust gas flow does not impact the injected exhaust gas aftertreatment medium directly perpendicularly, whereby the exhaust gas flow would push the injected medium flow aside in this area or would deflect the injected medium flow against end wall 7 of housing 2.

An air guiding element 14 is also situated in housing 4, which extends helically and eccentrically in housing 4, so that the exhaust gas flow and the injected aftertreatment medium is guided to an outlet opening 15 eccentrically formed in end wall 7. Due to the helical shape, the flow path in housing 4 is maximized. According to the present exemplary embodiment, air guiding element 14 extends semicircularly along the outer contour of circular outlet opening 15.

Air guiding element 14 begins at lateral wall 5 in this case, whereby the helical course results. The exhaust gas aftertreatment medium and the exhaust gas flow initially impact the outer side of air guiding element 14 and, thereafter, are routed through lateral wall 5 to the inside of air guiding element 14, which routes the flow to outlet opening 15. A swirl results in the exhaust gas-exhaust gas aftertreatment medium mixture in this case, as indicated by an arrow 16.

In this case, situated in parallel to air guiding element 14 are two further air guiding elements 17 and 18, which are designed to be shorter than air guiding element 14 and extend along a peripheral line, the radius of which has the same origin as the radius of air guiding element 14.

Further air guiding elements 17, 18 each includes multiple laterally projecting impact elements 19. Impact elements 19 each forms an impact surface 20 that faces injection opening 11. Impact elements 19 are oriented, in this case, in such a way that impact surfaces 20 lie essentially perpendicularly to the injection direction of the exhaust gas aftertreatment medium. In this case, impact elements 19 are designed as impact tabs which are bent out of further air guiding elements 17, 18. Further air guiding elements 17, 18 are formed, in this regard, as one piece with particular impact elements 19. Further air guiding elements 17, 18 can be produced, for example, as stamped and bent sheet-metal parts.

Further air guiding elements 17, 18 are situated, in areas, at the level of inlet opening 10, so that exhaust gas flowing in through inlet opening 10 can directly impact air guiding elements 17, 18.

During operation, the exhaust gas flow is therefore introduced into housing 4 through inlet openings 8, 9, and 10, while the exhaust gas aftertreatment medium is injected into housing 4 through injection opening 11. Due to advantageous section 13, the injected exhaust gas aftertreatment medium reaches impact surfaces 20 and atomizes there and is advantageously mixed with the exhaust gas flow which is also flowing in. Due to air guiding element 14 and the extension of air guiding elements 17, 18, the exhaust gas flow-exhaust gas aftertreatment medium mixture is routed along lateral wall 5 and air guiding element 14 to outlet opening 15, whereby swirl 16 results. Due to swirl 16, the downstream SCR catalytic converter or SCR-coated particulate filter is advantageously acted upon, so that an advantageous exhaust gas aftertreatment results.

Advantageous mixer device 1 has the advantage of an installation space-saving design including a long flow path which provides for advantageous mixing. In addition, an advantageous atomization of the exhaust gas aftertreatment medium is ensured. The placement of one or multiple sensors on the mixer device, in particular, upstream from the mixing area, is easily possible in order to monitor the exhaust gas aftertreatment. The injection valve is easily and cost-effectively situatable on housing 4 or on mixer device 1. Mixer device 1 provides for the maximum utilization of the thermal energy of the exhaust gas flow onto the impact surfaces and further air guiding elements 17, 18, whereby the robustness of the mixer device with respect to the exhaust gas aftertreatment medium is enhanced.

What is claimed is:

1. A mixer device for use with an exhaust gas aftertreatment system of a motor vehicle, comprising:
    a cylindrical housing, including:
        a lateral wall in which there is an injection opening for an exhaust gas aftertreatment medium;
        a first end wall in which there is at least one inlet opening; and
        a second end wall in which there is an outlet opening;
    at least one air guiding element that is situated in the housing, which extends in a curved manner, and guides an exhaust gas flow from the at least one inlet opening to the outlet opening; and
    at least one impact surface, situated in the housing downstream from the inlet opening, for the exhaust gas flow or the exhaust gas aftertreatment medium that is oriented essentially perpendicularly to an injection direction of the exhaust gas aftertreatment medium;
    wherein the at least one air guiding element extends helically and eccentrically in the housing, so as to maximize a flow path in the housing, and so that the exhaust gas flow and the injected exhaust gas aftertreatment medium is guided to the outlet opening in the second end wall.

2. The mixer device of claim 1, further comprising:
    at least one further air guiding element situated in the housing downstream from the inlet opening, parallel to the air guiding element, wherein at least one laterally projecting impact element projecting from the at least one further air guiding element forms the impact surface.

3. The mixer device of claim 2, wherein the at least one laterally projecting impact element includes a plurality of impact elements, each of which includes a respective one of the at least one impact surface.

4. The mixer device of claim 2, wherein each of the at least one laterally projecting impact element is an impact tab bent out of the at least one further air guiding element.

5. The mixer device of claim 1, wherein the at least one inlet opening includes a plurality of inlet openings.

6. The mixer device of claim 1, wherein the first end wall includes a section that extends in parallel to the injection direction and includes no openings.

7. The mixer device of claim 6, further comprising:
    at least one further air guiding element situated in the housing downstream from the inlet opening, parallel to the air guiding element;
    wherein at least one laterally projecting impact element projecting from the at least one further air guiding element forms the impact surface, and
    wherein the section begins at a level of the injection opening and ends spaced apart from the at least one further air guiding element.

8. The mixer device of claim 1, wherein the outlet opening is eccentrically situated or formed in the second end wall.

9. An exhaust gas aftertreatment system for a motor vehicle, comprising:
    at least one mixer to which an exhaust gas flow of an internal combustion engine and a liquid exhaust gas aftertreatment medium are routable, wherein each of the at least one mixer includes a cylindrical housing that includes:
        a lateral wall in which there is an injection opening for the exhaust gas aftertreatment medium;
        a first end wall in which there is at least one inlet opening; and
        a second end wall in which there is an outlet opening;
    at least one air guiding element that is situated in the housing, extends in a curved manner, and guides the exhaust gas flow from the at least one inlet opening to the outlet opening; and
    at least one impact surface, situated in the housing downstream from the inlet opening, for the exhaust gas flow or the exhaust gas aftertreatment medium that is oriented essentially perpendicularly to an injection direction of the exhaust gas aftertreatment medium;

wherein the at least one air guiding element extends helically and eccentrically in the housing, so as to maximize a flow path in the housing, and so that the exhaust gas flow and the injected exhaust gas aftertreatment medium is guided to the outlet opening in the second end wall.

10. A motor vehicle, comprising:

an internal combustion engine; and an exhaust gas aftertreatment system that includes at least one mixer to which an exhaust gas flow of the internal combustion engine and a liquid exhaust gas aftertreatment medium are routable, wherein each of the at least one mixer includes a cylindrical housing that includes:
  a lateral wall in which there is an injection opening for the exhaust gas aftertreatment medium;
  a first end wall in which there is at least one inlet opening; and
  a second end wall in which there is an outlet opening;
  at least one air guiding element that is situated in the housing, extends in a curved manner, and guides the exhaust gas flow from the at least one inlet opening to the outlet opening; and
  at least one impact surface, situated in the housing downstream from the inlet opening, for the exhaust gas flow or the exhaust gas aftertreatment medium that is oriented essentially perpendicularly to an injection direction of the exhaust gas aftertreatment medium;

wherein the at least one air guiding element extends helically and eccentrically in the housing, so as to maximize a flow path in the housing, and so that the exhaust gas flow and the injected exhaust gas aftertreatment medium is guided to the outlet opening in the second end wall.

11. The mixer device of claim 1, wherein the at least one inlet opening includes at least three inlet openings.

12. The mixer device of claim 11, wherein a first inlet opening has a circle shape, at least a second inlet opening has a wedge shape, and a third inlet opening has a circle segment shape.

13. The mixer device of claim 12, wherein the first inlet opening is situated approximately upstream from an injection opening, the at least second inlet opening begins approximately at a level of the injection opening and extends essentially in parallel to an injection direction, an inner width of the at least second inlet opening expanding so as to form the wedge shape.

14. The mixer device of claim 13, wherein the at least second inlet opening having the wedge shape includes two inlet openings having the wedge shape, which are positioned inversely with respect to each other, so that a section, which is without openings, lies between them.

15. The mixer device of claim 14, wherein the section extends from the injection opening up to the third inlet opening in the first end wall, and wherein the section provides that the exhaust gas flow does not impact the injected exhaust gas aftertreatment medium directly perpendicularly, so that the exhaust gas flow would push the injected medium flow aside in this area or would deflect the injected medium flow against the second end wall of the housing.

* * * * *